(12) United States Patent
Frabetti (10) Patent No.: US 7,726,101 B2
(45) Date of Patent: Jun. 1, 2010

(54) METHOD AND MACHINE FOR FILLING CAPSULES OR SIMILAR WITH AT LEAST ONE PRODUCT, IN PARTICULAR A PHARMACEUTICAL PRODUCT IN MICROTABLETS

(75) Inventor: Davide Frabetti, Baricella (IT)

(73) Assignee: MG 2 - S.r.l., Pianoro (IT)

( * ) Notice: Subject to any disclaimer, the term of this patent is extended or adjusted under 35 U.S.C. 154(b) by 240 days.

(21) Appl. No.: 12/104,535

(22) Filed: Apr. 17, 2008

(65) Prior Publication Data
US 2008/0256908 A1   Oct. 23, 2008

(30) Foreign Application Priority Data
Apr. 19, 2007   (EP)   ................... 07425230

(51) Int. Cl.
A61J 3/07   (2006.01)
B65B 1/32   (2006.01)
B65B 1/30   (2006.01)

(52) U.S. Cl. .............. 53/471; 53/473; 53/502; 53/253; 53/281; 53/900; 141/83

(58) Field of Classification Search ............ 53/247, 53/249, 250, 253, 281, 282, 473, 471, 502, 53/454, 560, 900; 141/83; 177/55, 58; A61J 3/07; B65B 1/30, 1/32, 1/46
See application file for complete search history.

(56) References Cited

U.S. PATENT DOCUMENTS

| | | | | |
|---|---|---|---|---|
| 3,501,894 A | * | 3/1970 | Hayashi et al. | 53/281 |
| 4,089,152 A | * | 5/1978 | Zanasi | 53/281 |
| 4,408,641 A | * | 10/1983 | Yamamoto et al. | 141/82 |
| 4,431,070 A | * | 2/1984 | Andrews | 177/102 |
| 5,018,335 A | * | 5/1991 | Yamamoto et al. | 53/281 |
| 5,340,949 A | * | 8/1994 | Fujimura et al. | 141/83 |
| 5,515,740 A | * | 5/1996 | Gamberini | 73/865.8 |
| 5,971,037 A | * | 10/1999 | Ansaloni | 141/83 |
| 6,837,280 B2 | * | 1/2005 | Ragazzini et al. | 141/83 |
| 6,901,972 B1 | * | 6/2005 | Nelson | 141/67 |
| 7,536,843 B2 | * | 5/2009 | Djurle et al. | 53/502 |
| 2005/0230000 A1 | * | 10/2005 | Gamberini | 141/83 |
| 2007/0144674 A1 | * | 6/2007 | Gamberini | 156/350 |
| 2007/0284015 A1 | * | 12/2007 | Ansaloni et al. | 141/129 |
| 2008/0127609 A1 | * | 6/2008 | Tagliavini et al. | 53/53 |
| 2008/0134629 A1 | * | 6/2008 | Schmied et al. | 53/55 |
| 2008/0256906 A1 | * | 10/2008 | Gamberini | 53/502 |
| 2008/0256908 A1 | * | 10/2008 | Frabetti | 53/502 |

FOREIGN PATENT DOCUMENTS

| | | | |
|---|---|---|---|
| CH | 662993 A5 | * | 11/1987 |
| JP | 06298201 A | * | 10/1994 |
| JP | 06345189 A | * | 12/1994 |
| WO | 03/094824 | | 11/2003 |
| WO | 2006035285 | | 4/2006 |

* cited by examiner

Primary Examiner—Stephen F Gerrity
(74) Attorney, Agent, or Firm—Gottlieb, Rackman & Reisman (57) ABSTRACT

A method and machine for filling capsules with at least one pharmaceutical product, whereby the bottom shell of each capsule is fed along a given path in time with a relative metering chamber for transferring a given quantity of product from a container into the bottom shell; a control device weighing the product in the metering chamber to cut off supply of the product into the metering chamber, when the weight of the product substantially equals a given reference value.

26 Claims, 10 Drawing Sheets

METHOD AND MACHINE FOR FILLING CAPSULES OR SIMILAR WITH AT LEAST ONE PRODUCT, IN PARTICULAR A PHARMACEUTICAL PRODUCT IN MICROTABLETS

The present invention relates to a machine for filling capsules or similar with at least one product.

More specifically, the present invention relates to a machine for filling capsules with at least one pharmaceutical product. In the following description, the pharmaceutical product considered is defined by microtablets, to which the following description refers purely by way of example.

BACKGROUND OF THE INVENTION

In the pharmaceutical industry, a machine for filling capsules with microtablets is known comprising a conveyor device movable continuously along a given path and having a number of pockets, each for housing a respective bottom shell of a capsule; a vibrating dispenser plate containing the microtablets; and a metering wheel mounted to rotate continuously about its substantially vertical longitudinal axis.

The metering wheel has a number of metering devices, each of which travels with the metering wheel along a portion of the path of the bottom shells, in time with a respective bottom shell, to transfer a given quantity of product from the vibrating dispenser plate into the bottom shell.

Each metering device comprises a metering chamber communicating with the vibrating dispenser plate and having a shutter movable between a closed position, in which the metering chamber is filled with a given quantity of microtablets, and an open position, in which the metering chamber communicates with the relative bottom shell to transfer the microtablets into the bottom shell.

Supply of the microtablets into the metering chamber is controlled selectively by a recirculating device located at the inlet of the metering chamber to recirculate the microtablets inside the vibrating dispenser plate and cut off supply to the metering chamber.

Known machines of the type described above have various drawbacks, mainly due to the fact that, given the shape, size, and random distribution of the microtablets inside the metering chambers, the metering chambers, and hence the relative bottom shells, may be supplied with different quantities of microtablets, thus impairing the production of capsules all containing the same quantity of microtablets.

SUMMARY OF THE INVENTION

It is an object of the present invention to provide a machine for filling capsules or similar with at least one product, and designed to eliminate the aforementioned drawbacks.

According to the present invention, there is provided a machine for filling capsules or similar with at least one product, as claimed in the attached Claims.

The present invention also relates to a method of filling capsules or similar with at least one product.

According to the present invention, there is provided a method of filling capsules or similar with at least one product, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
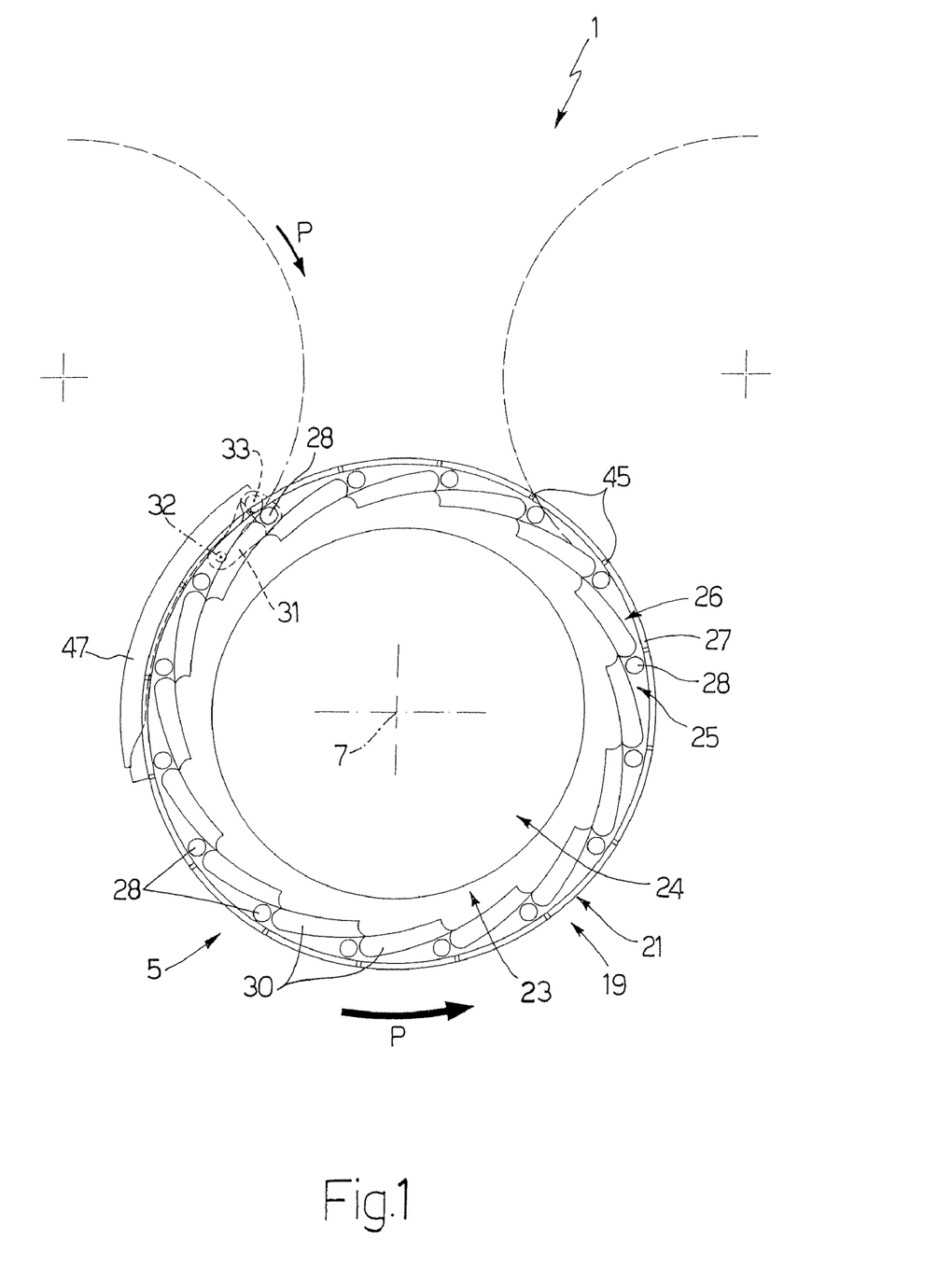
FIG. 1 shows a schematic plan view of a preferred embodiment of the machine according to the present invention.
Figure 2:
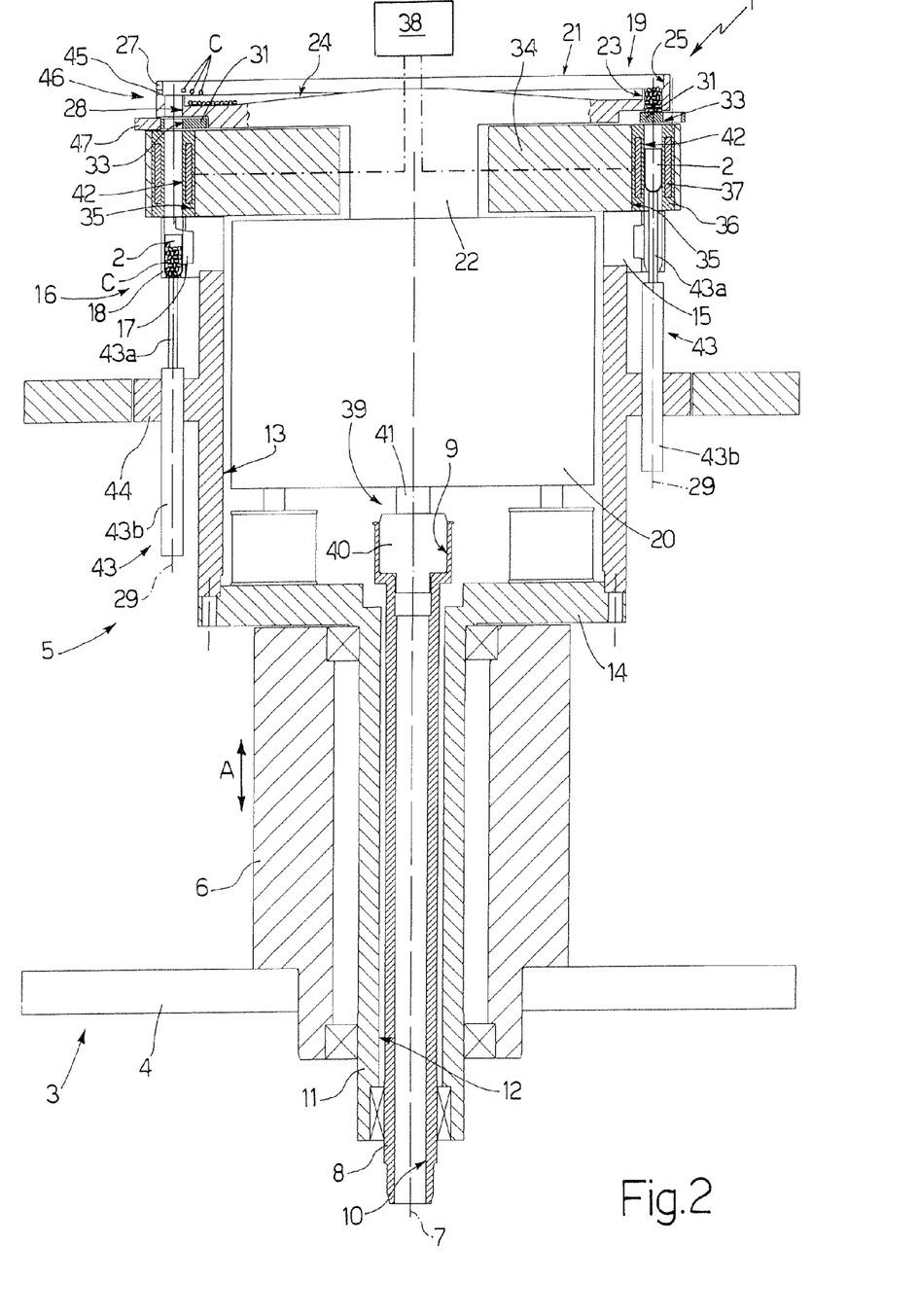
FIG. 2 shows a schematic side view of a detail of the FIG. 1 machine.

Number 1 in FIGS. 1 and 2 indicates as a whole a machine for filling known capsules (not shown) with at least one pharmaceutical product defined by microtablets C. Each capsule (not shown) comprises a substantially cup-shaped bottom shell 2, and a top shell (not shown) closing bottom shell 2.

Machine 1 comprises a frame 3 bounded at the top by a flat, substantially horizontal plate 4; and a metering wheel 5, in turn comprising a fixed supporting sleeve 6, which extends upwards from plate 4, has a substantially vertical longitudinal axis 7 perpendicular to plate 4, and is engaged centrally by a fixed sleeve 8, which is mounted coaxially with axis 7, extends through plate 4, and has a wide top portion 9 and a narrow bottom portion 10.

Wheel 5 also comprises a shaft 11, which is mounted coaxially with axis 7, is connected to sleeve 6 and sleeve 8 to rotate continuously about axis 7 with respect to frame 3 and under the control of a known actuating device not shown, and comprises a narrow bottom portion 12 between sleeve 6 and sleeve 8, and a wide top portion 13, which extends above sleeve 6, is engaged centrally by wide top portion 9 of sleeve 8, and is bounded at the bottom by a flat bottom wall 14 perpendicular to axis 7.

A sprocket 15 is fixed to the top end of shaft 11, coaxially with axis 7, and forms part of a known conveyor device 16, which feeds each bottom shell 2 along a given path P, and comprises a chain conveyor 17 looped about a number of powered, sprockets (of which only sprocket 15 is shown in FIG. 2).

Conveyor 17 comprises a number of pockets 18, which are substantially cup-shaped with their concavity facing upwards, are equally spaced along conveyor 17, are axially open in a direction A parallel to axis 7, are each designed to house a respective bottom shell 2 with its concavity facing upwards, and are fed continuously by conveyor 17 along path P.

Wheel 5 also comprises a feed assembly 19 for supplying microtablets C, and in turn comprising a vibrating base 20, which is fixed to wall 14, coaxially with axis 7, is housed inside sprocket 15 and top portion 13 of shaft 11, and supports a dispenser plate 21 perpendicular to axis 7 and connected to base 20 with the interposition of a central projection 22 projecting upwards from base 20.

Figure 3:
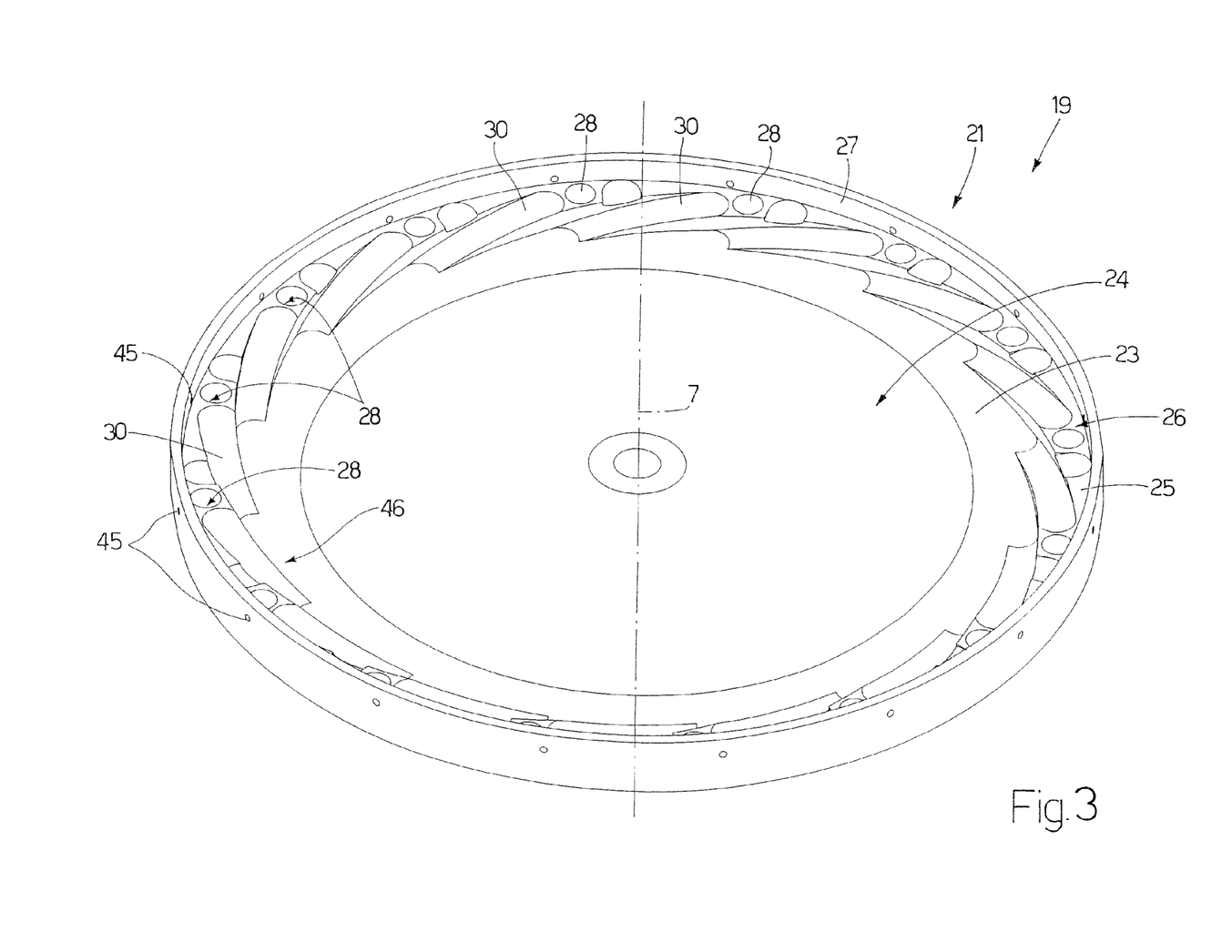
FIG. 3 shows a view in perspective of a detail in FIG. 2.

As shown in FIG. 3, plate 21 is substantially cup-shaped, and comprises a narrow bottom portion 23 bounded at the bottom by a substantially truncated-cone-shaped bottom wall 24; and a wide top portion 25, which is bounded at the bottom by a substantially flat bottom wall 26 perpendicular to axis 7, and is bounded laterally by a substantially cylindrical lateral wall 27 coaxial with axis 7.

Plate 21 comprises a number of holes 28 equally spaced about axis 7, extending through plate 21, and having respective longitudinal axes 29 parallel to one another and to direction A; and, for each hole 28, a respective feed channel 30, which extends between walls 24 and 26, coils about axis 7, and has an inlet facing a peripheral edge of wall 24, and an outlet facing hole 28.

In actual use, by virtue of the shape of wall 24, of rotation of plate 21 about axis 7, and of vibration of plate 21 by base 20, microtablets C are first distributed radially outwards along a peripheral edge of wall 24, and are then fed along channels 30 and through holes 28.

Each hole 28 has a contoured shutter plate 31, which is fitted beneath hole 28, is hinged to plate 21 to oscillate, with respect to plate 21, about a hinge axis 32 parallel to axis 7, has a hole 33 formed through plate 31 and parallel to direction A, and is normally maintained in a closed position, in which plate 31 closes the bottom of hole 28, by a torsion spring not shown.

Wheel 5 also comprises an annular disk 34, which extends about projection 22, coaxially with axis 7, is connected in angularly fixed manner to shaft 11, and has a number of holes 35, which are equally spaced about axis 7, extend, parallel to direction A, through disk 34, are equal in number to holes 28, and are each positioned facing and coaxial with a relative hole 28.

Each hole 35 houses a bush 36 mounted coaxially with relative axis 29 and having a capacitive transducer 37, which is integrated in bush 36, forms part of a weighing device 38 for weighing the product in bottom shells 2, and is powered electrically by a connector 39 common to all of capacitive transducers 37. Connector 39 is mounted coaxially with axis 7, and comprises a fixed member 40 housed in wide top portion 9 of sleeve 8; and a movable member 41, which is fixed to base 20, is connected in rotary manner to member 40, and is connected electrically to capacitive transducers 37.

Bush 36, capacitive transducer 37, and weighing device 38 are described and illustrated in the Applicant's Patent Application WO-2006/035285-A2, the content of which forms an integral part of the present patent application.

Each bush 36 defines a bottom portion of a metering chamber 42, which also comprises a top portion defined by relative hole 28, is fed continuously by wheel 5. about axis 7, and is fed, in time with a relative pocket 18, along a portion of path P to transfer a given quantity of microtablets C from plate 21 into a relative bottom shell 2.

Each chamber 42 is associated with a push member 43, which extends in direction A, is aligned and coaxial with chamber 42, is fitted through a flange 44 projecting radially outwards from wide top portion 13 of shaft 11, engages the bottom of bottom shell 2 housed inside pocket 18 travelling in time with chamber 42, is fitted in sliding manner to flange 44, and is controlled by a known actuating device (not shown) to move bottom shell 2, with respect to plate 21, between pocket 18 and chamber 42 in direction A.

Member 43 comprises a top portion 43a made of insulating material with little or no dielectric constant, and fitted to a bottom portion 43b of member 43 made, for example, of metal.

Figure 4A:
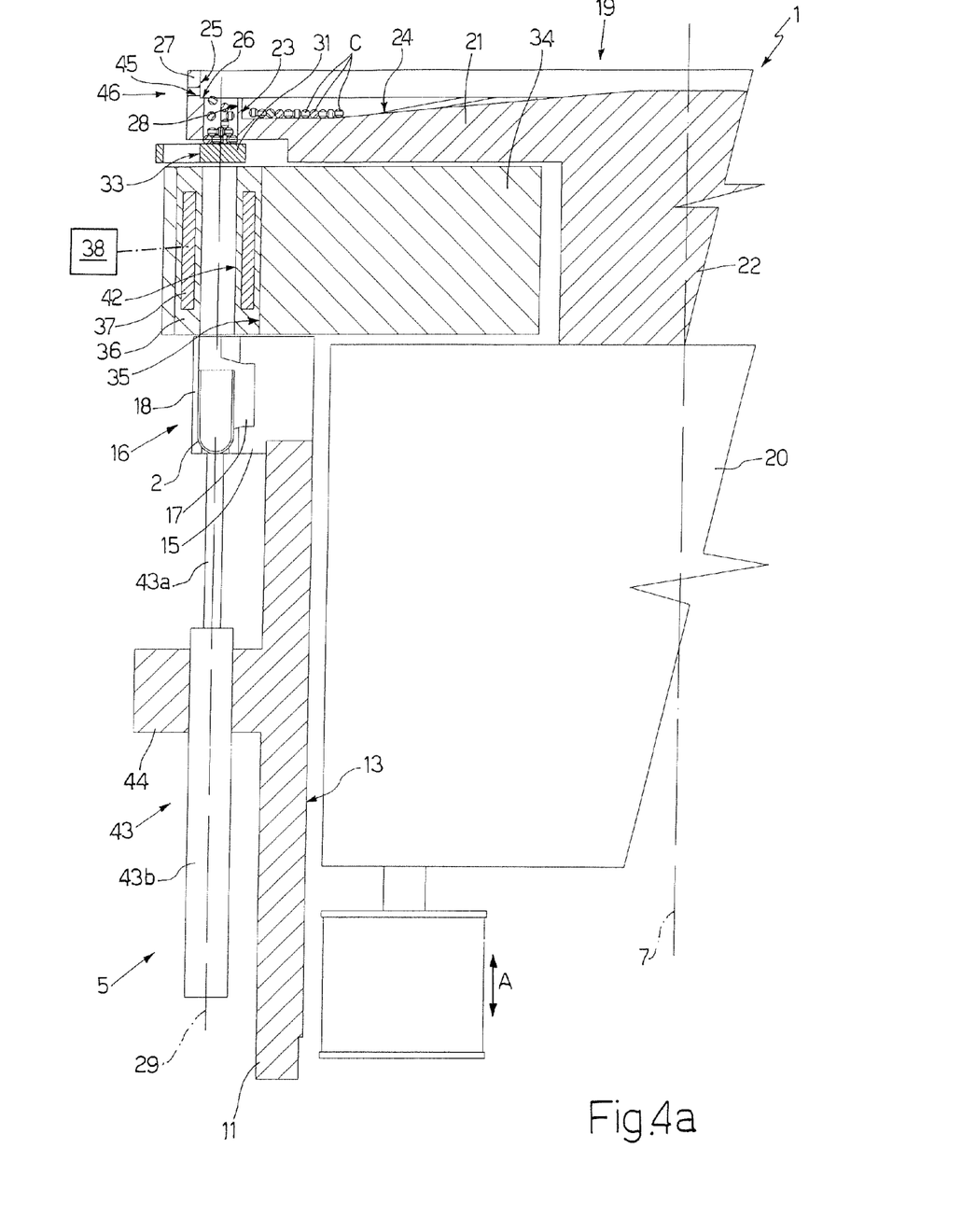
FIG. 4a-4g shows schematics of operation of the FIG. 1 machine.

Operation of machine 1 will now be described with reference to FIG. 4a-4g and to the filling of one bottom shell 2, and as of the instant in which (FIG. 4a):

the bottom shell 2 considered is advanced by conveyor 17 inside a respective pocket 18 and in time with a relative metering chamber 42; and shutter plate 31 of the chamber 42 considered is set to the closed position to fill relative hole 28 with a quantity of microtablets C smaller than the quantity of microtablets C to be fed into bottom shell 2.

Figure 4B:
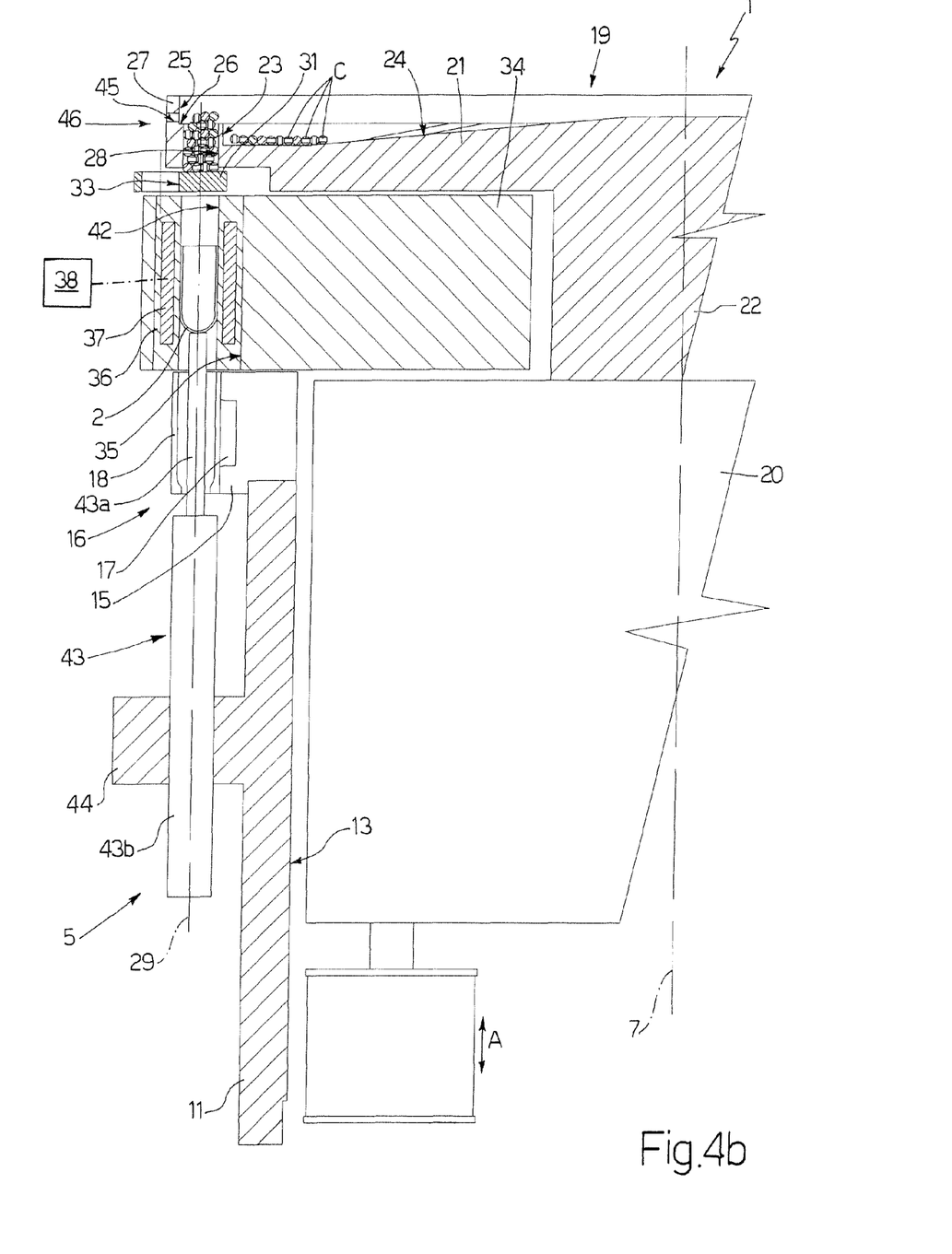

As hole 28 is being filled, push member 43 of the chamber 42 considered is raised in direction A to push bottom shell 2 into bush 36 to allow capacitive transducer 37 to weigh bottom shell 2 (FIG. 4b).

Figure 4C:
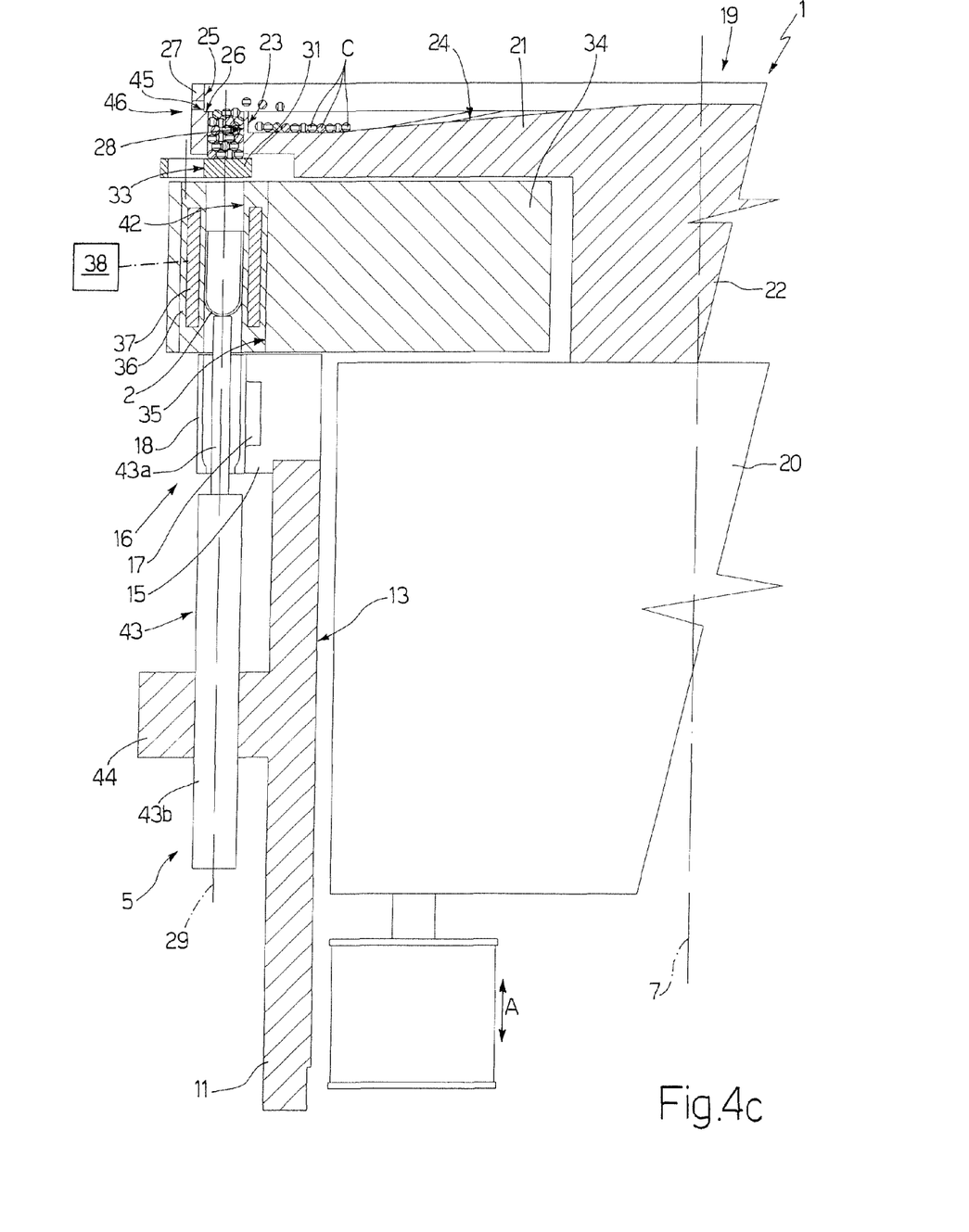

With reference to FIG. 4c, once hole 28 is filled, supply of microtablets C to hole 28 is cut off by activating a compressed-air jet directed between the outlet of relative feed channel 30 and hole 28 by a radial feed conduit 45 (FIGS. 2 and 3), which is formed, crosswise to direction A, through lateral wall 27 of plate 21, is connected to a known compressed-air feed device not shown, and forms part of a pneumatic recirculating device 46 connected to weighing device 38 to selectively recirculate microtablets C from channels 30 onto plate 21.

Figure 4D:
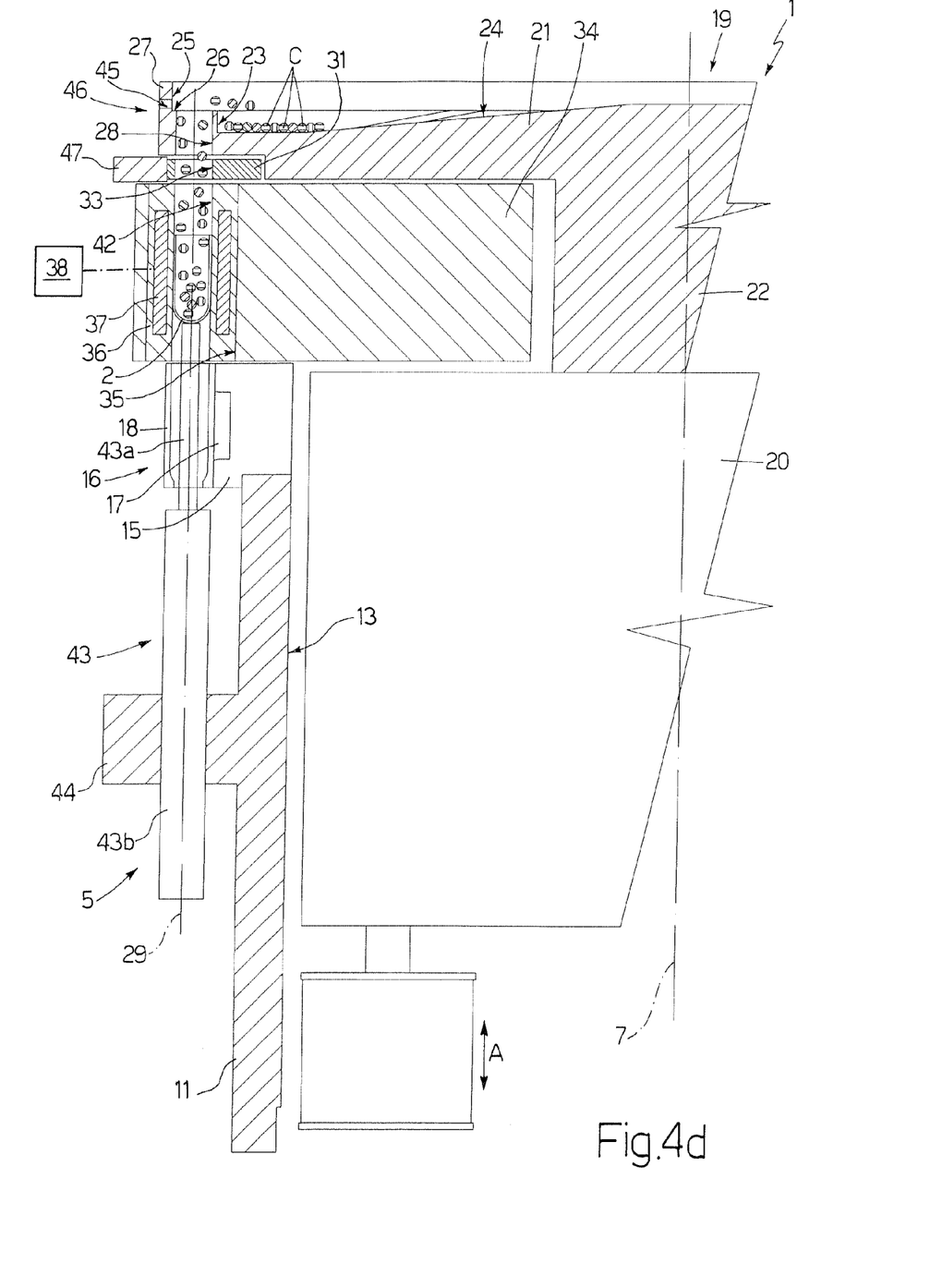

As shown in FIG. 4d, while the air jet from conduit 45 is active, a fixed cam 47 (FIG. 1), extending about axis 7, moves plate 31 from the closed position to an open position, in which relative hole 33 is aligned and coaxial with hole 28 to allow the microtablets C inside hole 28 to drop into bottom shell 2.

Figure 4E:
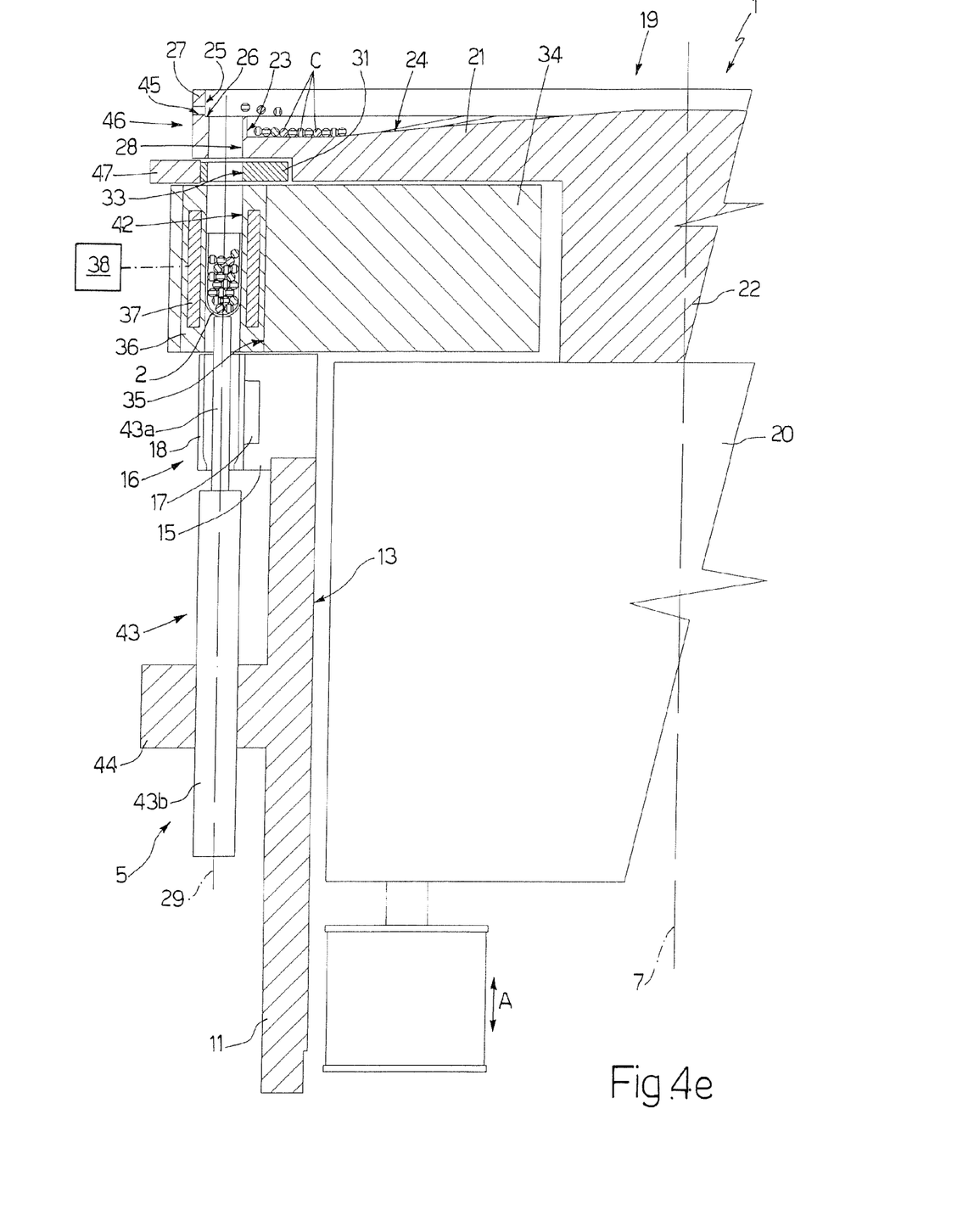

At this point, capacitive transducer 37 determines the total weight of bottom shell 2 and the microtablets C fed into bottom shell 2 (FIG. 4e).

Figure 4F:
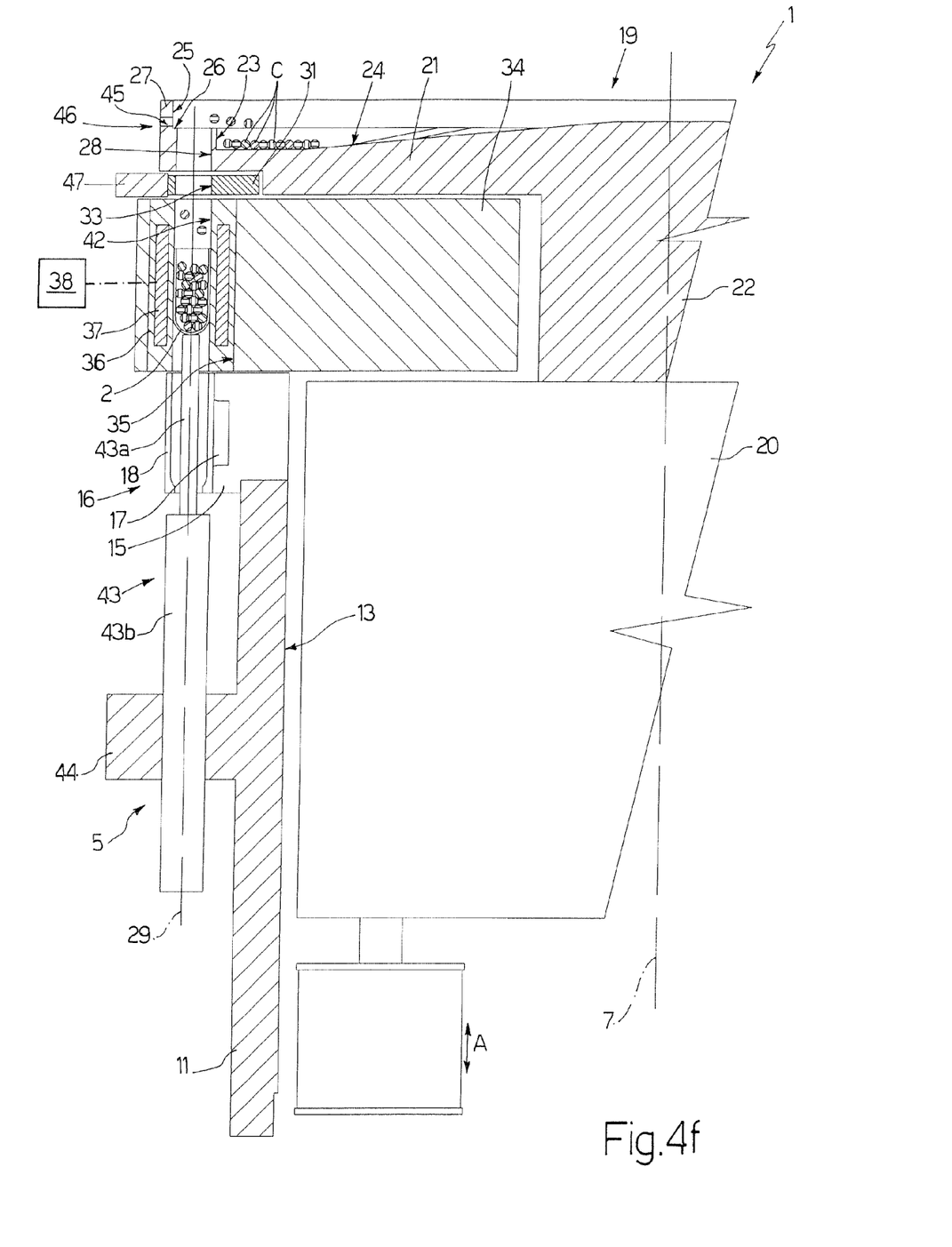

Next, the air jet from conduit 45 is cut off, plate 31 is left in the open position to allow more microtablets C to drop through hole 28 into bottom shell 2, and capacitive transducer 37 continuously determines the total weight of bottom shell 2 and the microtablets C inside bottom shell 2 (FIG. 4f).

Figure 4G:
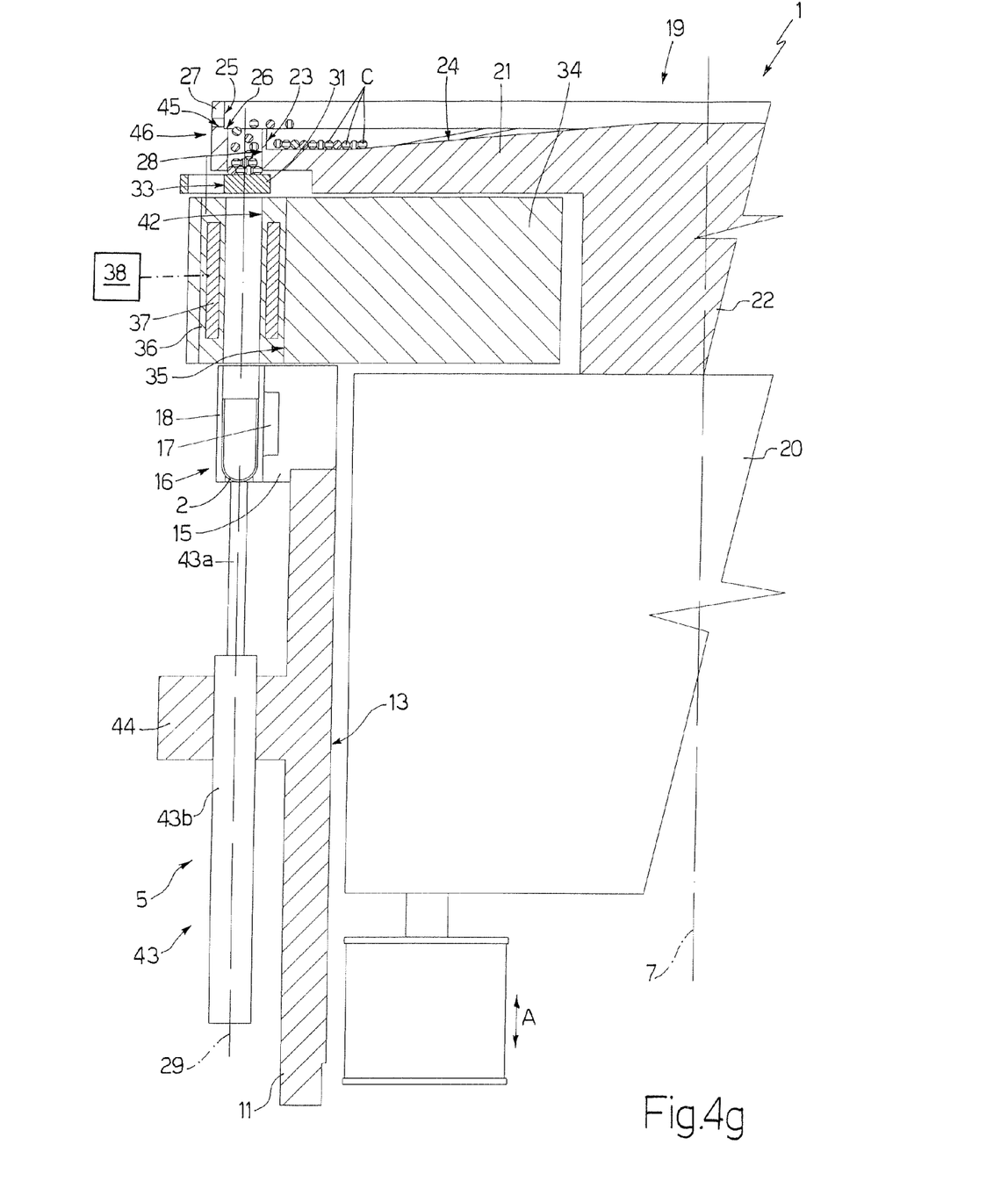

When the total weight of bottom shell 2 and the microtablets C inside bottom shell 2 substantially equals a reference value memorized in weighing device 38, the air jet from conduit 45 is again activated to cut off supply of microtablets C to hole 28, and therefore to bottom shell 2; plate 31 disengages cam 47 and is restored to the closed position; push member 43 is lowered in direction A to reinsert bottom shell 2 inside pocket 18; and the air jet from conduit 45 is again cut off to permit another operating cycle of the chamber 42 considered (FIG. 4g).

In a variation not shown, shutter plates 31 may obviously be eliminated, and microtablets C may be fed continuously into each bottom shell 2 until the total weight of bottom shell 2 and the microtablets C inside bottom shell 2 substantially equals the reference value memorized in weighing device 38.

In another variation not shown, push members 43 are eliminated, annular disk 34 is replaced by sprocket 15, bushes 36 and capacitive transducers 37 are fitted inside holes 28, and microtablets C are first fed into bushes 36, until their weight substantially equals a given reference value, and then into bottom shells 2.

The weight of microtablets C in each bottom shell 2 may therefore be determined continuously or intermittently inside or outside bottom shell 2, and, whichever the case, is always determined when feeding microtablets C into the relative metering chamber 42, so bottom shells 2 are all filled with the right amount of microtablets C, thus preventing the production of faulty capsules (not shown).

The invention claimed is:

1. A machine for filling capsules with at least one product; each capsule comprising a bottom shell (2), and a top shell closing the bottom shell (2); the machine comprising a conveyor device (16) for feeding each bottom shell (2) continuously along a given path (P); at least one container (21) for the product; at least one metering wheel (5) mounted to rotate continuously about a substantially vertical longitudinal axis (7); and a number of metering devices (31, 42) movable with the metering wheel (5) along a portion of the path (P), in time with relative bottom shells (2); each metering device (31, 42) comprising a respective metering chamber (42) for transferring the product from the container (21) into the relative bottom shell (2), and, for each metering chamber (42), feed means (30, 45) for selectively transferring the product from the container (21) into the metering chamber (42); and the machine being characterized by also comprising a weighing device (37, 38) for weighing the product contained in each metering chamber (42); the weighing device (37, 38) being connected to the feed means (30, 45) to cut off supply of the product from the container (21) to the metering chamber (42) when the weight of the product determined by the weighing device (37, 38) substantially equals a reference value memorized in the weighing device (37, 38).

2. A machine as claimed in claim 1, wherein the weighing device (37, 38) comprises at least one capacitive transducer (37).

3. A machine as claimed in claim 1, wherein the weighing device (37, 38) comprises a bush (36) at least partly defining said metering chamber (42).

4. A machine as claimed in claim 3, wherein the bush (36) has at least one capacitive transducer (37).

5. A machine as claimed in claim 1, wherein each metering device (31, 42) also comprises shutter means (31) for closing the metering chamber (42), and which are movable between a closed position, in which the metering chamber (42) is filled with the product, and an open position, in which the product is transferred from the metering chamber (42) into the relative bottom shell (2).

6. A machine as claimed in claim 1, wherein the conveyor device (16) comprises a number of pockets (18) for respective bottom shells (2); each metering device (31, 42) comprising transfer means (43) for transferring the relative bottom shell (2) between the relative pocket (18) and the relative metering chamber (42) to allow the weighing device (37, 38) to first weigh the bottom shell (2), and then determine the total weight of the bottom shell (2) and the product inside the bottom shell (2).

7. A machine as claimed in claim 6, wherein each metering chamber (42) comprises a top portion (28), a bottom portion (36), and on-off means (31) interposed between said top portion and said bottom portion (28, 36); actuating means (47) being provided to move the on-off means (31) between a closed position, in which said top portion and said bottom portion (28, 36) are separated, and an open position, in which said top portion and said bottom portion (28, 36) communicate with each other.

8. A machine as claimed in claim 7, wherein the weighing device (37, 38) comprises a weighing member (37) housed in said bottom portion (36).

9. A machine as claimed in claim 1, and comprising, for each metering chamber (42), a recirculating device (45) located at the inlet of the metering chamber (42) and connected to the weighing device (37, 38) to cut off flow of the product into the metering chamber (42).

10. A machine as claimed in claim 9, wherein the recirculating device (45) is a pneumatic recirculating device.

11. A machine as claimed in claim 1, wherein the container (21) comprises a vibrating dispenser plate (21) having, for each metering chamber (42), a feed channel (30) for feeding the product to the metering chamber (42).

12. A machine as claimed in claim 11, and comprising, for each metering chamber (42), a recirculating device (45) located between the metering chamber (42) and the relative feed channel (30) and connected to the weighing device (37, 38) to recirculate the product from the feed channel (30) onto the vibrating dispenser plate (21).

13. A method of filling capsules with at least one product, on a machine comprising at least one container (21) for the product; at least one metering wheel (5) mounted to rotate continuously about a substantially vertical longitudinal axis (7); and a number of metering devices (31, 42) movable with the metering wheel (5) about said axis (7), and each comprising a respective metering chamber (42) for transferring the product from the container (21) into a bottom shell (2) of a relative capsule; the method comprising the steps of:
advancing each bottom shell (2) continuously, in time with a relative metering device (31, 42); and
feeding the product selectively from the container (21) into the metering chamber (42) of the metering device (31, 42);
and being characterized by also comprising the steps of:
weighing the product contained in the metering chamber (42); and
cutting off supply of the product from the container (21) into the metering chamber (42), when the measured weight of the product in the metering chamber (42) substantially equals a reference value.

14. A method as claimed in claim 13, wherein the product in the metering chamber (42) is weighed by means of at least one capacitive transducer (37).

15. A method as claimed in claim 13, wherein the product in the metering chamber (42) is weighed inside a bush (36) at least partly defining the metering chamber (42).

16. A method as claimed in claim 15, wherein the bush (36) has at least one capacitive transducer (37).

17. A method as claimed in claim 13, and also comprising the step of:
transferring the product from the metering chamber (42) into the relative bottom shell (2), when the measured weight of the product in the metering chamber (42) substantially equals said reference value.

18. A method as claimed in claim 13, wherein the product in the metering chamber (42) is weighed continuously.

19. A method as claimed in claim 13, and also comprising, in succession and in the following order, the steps of:
feeding a first quantity of product from the container (21) into the metering chamber (42);
cutting off supply of the first quantity of product from the container (21) into the metering chamber (42);
weighing the first quantity of product;
feeding a second quantity of product from the container (21) into the metering chamber (42);
determining the total weight of said first and said second quantity of product;
cutting off supply of the second quantity of product, when the total weight of said first and said second quantity of product substantially equals said reference value; and
transferring said first and said second quantity of product from the metering chamber (42) into the relative bottom shell (2).

20. A method as claimed in claim 19, wherein the total weight of said first and said second quantity of product is determined continuously.

21. A method as claimed in claim 13, and also comprising, in succession and in the following order, the steps of:
transferring the bottom shell (2) into the metering chamber (42);
weighing the bottom shell (2);
feeding the product from the container (21) into the metering chamber (42) and the bottom shell (2);
determining the total weight of the bottom shell (2) and the product inside the bottom shell (2); and
cutting off supply of the product from the container (21) into the metering chamber (42) and the bottom shell (2), when the total weight of the bottom shell (2) and the product inside the bottom shell (2) substantially equals said reference value.

22. A method as claimed in claim 21, wherein the total weight of the bottom shell (2) and the product inside the bottom shell (2) is determined continuously.

23. A method as claimed in claim 13, and also comprising, in succession and in the following order, the steps of:
- transferring the bottom shell (2) into the metering chamber (42);
- weighing the bottom shell (2);
- feeding a first quantity of product from the container (21) into the metering chamber (42) and the bottom shell (2);
- cutting off supply of the first quantity of product;
- determining the total weight of the bottom shell (2) and the first quantity of product;
- feeding a second quantity of product from the container (21) into the metering chamber (42) and the bottom shell (2);
- determining the total weight of the bottom shell (2) and said first and second quantity of product; and
- cutting off supply of the second quantity of product, when the total weight of the bottom shell (2) and said first and second quantity of product substantially equals said reference value.

24. A method as claimed in claim 23, wherein the total weight of the bottom shell (2) and said first and second quantity of product is determined continuously.

25. A method as claimed in claim 13, and also comprising the step of:
- feeding the product into the metering chamber (42) by means of a vibrating dispenser plate (21) defining said container (21).

26. A method as claimed in claim 13, and also comprising the step of:
- recirculating into the container (21) the product fed to the inlet of the metering chamber (42), to cut off supply of the product into the metering chamber (42).

* * * * *